UNITED STATES PATENT OFFICE.

DUBOIS D. PARMELEE, OF NEW YORK, N. Y., ASSIGNOR TO CHAS. L. RICHARDS AND THOS. C. SMITH.

IMPROVED MOLD FOR VULCANIZING RUBBER.

Specification forming part of Letters Patent No. 53,034, dated March 6, 1866.

*To all whom it may concern:*

Be it known that I, DUBOIS D. PARMELEE, of New York, in the county and State of New York, have invented certain new and useful Improvements in Molding or Shaping Various Articles Made of India-rubber, Gutta-Percha, and other vulcanizable compounds or plastic compounds which require to be heated and vulcanized, the same not having been known previous to my invention; and I hereby declare that the following is a full, clear, and exact description of the same.

The nature of this invention consists in the use for the mold of a material which will not be acted upon by sulphur at the temperature of vulcanization, while at the same time it will take impressions of the finest lines and chasings from a model to be many times duplicated.

Before describing my invention I will here state that metals, such as iron, copper, brass, and alloys of lead, tin, bismuth, &c., have been heretofore employed for the purposes to which my invention relates; but for the vulcanization of india-rubber sulphur is required to be incorporated with it in proportions varying according to the degree of softness or hardness of the rubber to be produced. Thus for soft rubber the amount of sulphur incorporated in the rubber is much less than for hard rubber or vulcanite, and the heat to which the compound is subjected in either case is considerably above the melting-point of sulphur. Under these circumstances the metals heretofore used for molds are rapidly acted upon and the perfection of the chasings of the molds soon destroyed, so much so that they become worthless. This action is not only the result of the heated sulphur alone in contact with the metal, but also from the corrosive gases evolved during the process of vulcanization.

The object of my invention, therefore, is to remedy this difficulty by making a more durable mold at less expense than formerly, while at the same time a finer surface and better finish of the article may be attained.

To effect these advantages I employ porcelain, clay, or kaolin, prepared and manipulated precisely as now practiced by porcelain manufacturers for the manufacture of door-knobs, door-plates, tea-cups, ornaments, and a great many articles of common use; and having an image of metal, plaster-of-paris, wax, or other convenient material, which it is desired to duplicate, the plastic kaolin is impressed with the form and a mold produced precisely in the manner as is now practiced by artisans for making wax molds for plaster-of-paris castings, and also for making plaster-of-paris molds for wax models, and the porcelain form thus made is baked in the kiln in the same manner as is commonly done with all fine porcelain ware. The porcelain mold thus formed is then incased in a cast-iron frame and cemented to the metal by plaster-of-paris, which causes the whole to comport itself as if all of one piece. This inclosure of the porcelain mold, however, for most purposes, may be dispensed with; but for many purposes, particularly when the molds are very large, the iron casing will insure against the liability of breaking the molds when they are fastened together.

I am aware that plaster-of-paris molds have been used for vulcanizing india-rubber, principally for dental purposes; but such molds are intended to and cannot be used but once, as the material is too brittle to withstand the usage required of molds for repeated use.

What I claim as my invention is—

1. The manufacture of porcelain molds for purposes of vulcanization, substantially as herein described.

2. The vulcanization of the hard-rubber compound in molds made of porcelain or its homologues.

In testimony whereof I have signed my name to this specification before two subscribing witnesses.

DUBOIS D. PARMELEE.

Witnesses:
THOMAS C. LAPHAM,
EDWARD P. MARDEN.